(12) United States Patent
Schwarz

(10) Patent No.: US 6,562,310 B2
(45) Date of Patent: May 13, 2003

(54) GROUP IIA CONTAINING MESOPOROUS MATERIALS

(75) Inventor: Stephan Schwarz, Wilmington, DE (US)

(73) Assignee: E. I. du Pont de Nemours and Company, Wilmington, DE (US)

( * ) Notice: Subject to any disclaimer, the term of this patent is extended or adjusted under 35 U.S.C. 154(b) by 0 days.

(21) Appl. No.: 10/013,877

(22) Filed: Nov. 6, 2001

(65) Prior Publication Data

US 2002/0081258 A1 Jun. 27, 2002

Related U.S. Application Data

(60) Provisional application No. 60/246,644, filed on Nov. 8, 2000.

(51) Int. Cl.⁷ .............................................. C01B 33/12
(52) U.S. Cl. ........................................ 423/338; 423/335
(58) Field of Search ................................ 423/331, 335, 423/338; 501/12; 502/237, 250, 251

(56) References Cited

U.S. PATENT DOCUMENTS 4,707,504 A * 11/1987 Walkowiak et al. ........ 523/109
5,164,469 A * 11/1992 Goto et al. ............. 351/160 H
6,204,217 B1 * 3/2001 Pazzucconi et al. ........ 423/326
6,251,280 B1 * 6/2001 Dai et al. ................ 210/198.2

OTHER PUBLICATIONS

Matthew B.d. Mitchell, et al., Preparation and characterisation of forstente ($Mg_2SiO_4$), aerogels, Journal of Non–Crystalline Solids, vol. 225 (1998) pp 125–129 (no month).

R. Portillo, et al., Magnesia Synthesis via Sol–Gel: Structure and Reactivity, Langmuir, vol. 12 (1996) pp 40–44 (no month).

I. Izquierdo–Barba et al., In vitro calcium phosphate layer formation on sol–gel glasses of the $CaO-SiO_2$ system, Department de Quimica Inorganica y Bioinorganica, Facultad de Farmacia, Universidad Complutence de Matrid, E–28040–Madrid, Spain, (Apr. 7, 1999) pp 243–250.

N.N. Ghosh, et al., Synthesis o $SiO_2$–BaO powder by aqueous sol–gel processing for use in dental composite resins, British Ceramic Proceedings 54, Ceramic Films and Coatings, edited by W.E. Lee (Mar. 30, 1996) pp 277.

* cited by examiner

Primary Examiner—Ngoc-Yen Nguyen

(57) ABSTRACT

Mesoporous materials containing a Group IIA metal are prepared by a sol-gel type techniques.

7 Claims, 2 Drawing Sheets

GROUP IIA CONTAINING MESOPOROUS MATERIALS

This application claims the benefit of U.S. Provisional Application No. 60/246,644, filed Nov. 8, 2000, which is incorporated as a part hereof.

FIELD OF INVENTION

This invention relates to the preparation of mesoporous materials containing a Group IIA element prepared by sol-gel type techniques.

BACKGROUND

Porous materials play an important role in many chemical processes. Mg, Ba and Ca containing $SiO_2$'s can act as catalysts for base-catalyzed reactions. $MgO/SiO2$'s are ceramic precursors to enstatite, or forsterite (Matthew B. D. Mitchell et al, Preparation and characterisation of forsterite ($Mg_2SiO_4$) aerogels, *Journal of Non-Crystalline Solids*, 255, 1998, 125–129). $BaO/SiO_2$'s have been reported as components in dental resins and as components for alkali resistant coatings (N. N. Ghosh et al., Synthesis of $SiO_2$-BaO powder by aqueous sol-gel processing for use in dental composite resins, *British Ceramic Proceedings* 54, *Ceramic Films and Coatings*, edited by W. E. Lee). $CaO/SiO_2$'s have been used as media for bioactivity studies, as well as precursors for glass materials (I. lzquierdo-Barba et al., In vitro calcium phosphate layer formation on sol-gel glasses of the CaO-SiO2 system, Departmento de Quimica Inorganica y Bioinorganica, Facultad de Farmacia, Universidad Complutense de Matrid, E-28040-Madrid, Spain, Apr. 7, 1999). Controlling the size and distribution of the pores in such materials can assist in attaining desired physical and chemical properties.

Mesoporous materials are commonly prepared using sol-gel techniques followed by freezing-drying or supercritical extraction (R. Portillo et al., Magnesia Synthesis via Sol-Gel: Structure and Reactivity, Langmuir, 12, 1996, 40–44). Both of these techniques can be energy-intensive and require specialized equipment. There is a need for techniques to produce highly mesoporous materials efficiently and at atmospheric pressures.

SUMMARY OF THE INVENTION

The invention is directed to a silica-based material made by a process of: (i) dissolving a source compound containing a Group IIA element in a carboxylic acid to form a solution; (ii) adding to the solution obtained in step (i) a silicate selected from the group consisting of $Si(OR^1)_4$ and $SiR^3(OR^2)_3$, where $R^1$ is a $C_1$ to $C_4$ alkyl group, $R^2$ is a $C_1$ to $C_8$ alkyl group and $R^3$ is H, $C_6H_5$ or $R^2$, where $C_6H_5$ is a phenyl group, to form a gel; (iii) aging the gel product obtained in step (ii) for a time sufficient to incorporate the Group IIA element into the gel; (iv) refluxing the product obtained in step (iii) two or more times in a volatile solvent that is miscible or soluble with the carboxylic acid utilized in step (i); (v) drying the product obtained in step (iv); and (vi) optionally, calcining the silica-based material obtained in step (v). The carboxylic acid can be acetic acid or formic acid, preferably it is glacial acetic acid. The source compound can be a Group IIA alkoxide, acetate, or chloride such as Mg, Ca, or Ba. The reflux solvent can be hexane or ethanol. Optionally silylation is performed on the product obtained in step (iv).

The invention is also directed to a composition of matter including a mesoporous material containing a Group IIA-element and having a pore volume of about 1.1 cc/g to about 3.0 cc/g and having a majority of pores with a pore diameter of greater than about 7 nm. The material preferably has a pore volume of about 1.9 cc/g to about 3.0 cc/g, and a majority of pores with pore diameters between about 10 to about 15 nm. Preferably, all pore diameters are greater than or equal to 2 nm.

The invention is also directed to a process for preparing a silica-based material by: (i) dissolving a source compound containing a Group IIA element in a carboxylic acid to form a solution; (ii) adding to the solution obtained in step (i) a silicate selected from the group consisting of $Si(OR^1)_4$ and $SiR^3(OR^2)_3$, where $R^1$ is a $C_1$ to $C_4$ alkyl group, $R^2$ is a $C_1$ to $C_8$ alkyl group and $R^3$ is H, $C_6H_5$ or $R^2$, where $C_6H_5$ is a phenyl group, to form a gel; (iii) aging the gel product obtained in step (ii) for a time sufficient to incorporate the Group IIA element into the gel; (iv) refluxing the product obtained in step (iii) two or more times in a volatile solvent that is miscible or soluble with the carboxylic acid utilized in step (i); (v) drying the product obtained in step (vi) to yield a silica-based material; and (vi) optionally, calcining the silica-based material obtained in step (v). The carboxylic acid can be acetic acid or formic acid, preferably it is glacial acetic acid. The source compound can be a Group IIA, such as Mg, Ca, or Ba, alkoxide, acetate, or chloride. The reflux solvent can be hexane or ethanol. Optionally silylation is performed on the product obtained in step (iv).

DETAILED DESCRIPTION OF THE INVENTION

Figure 1:
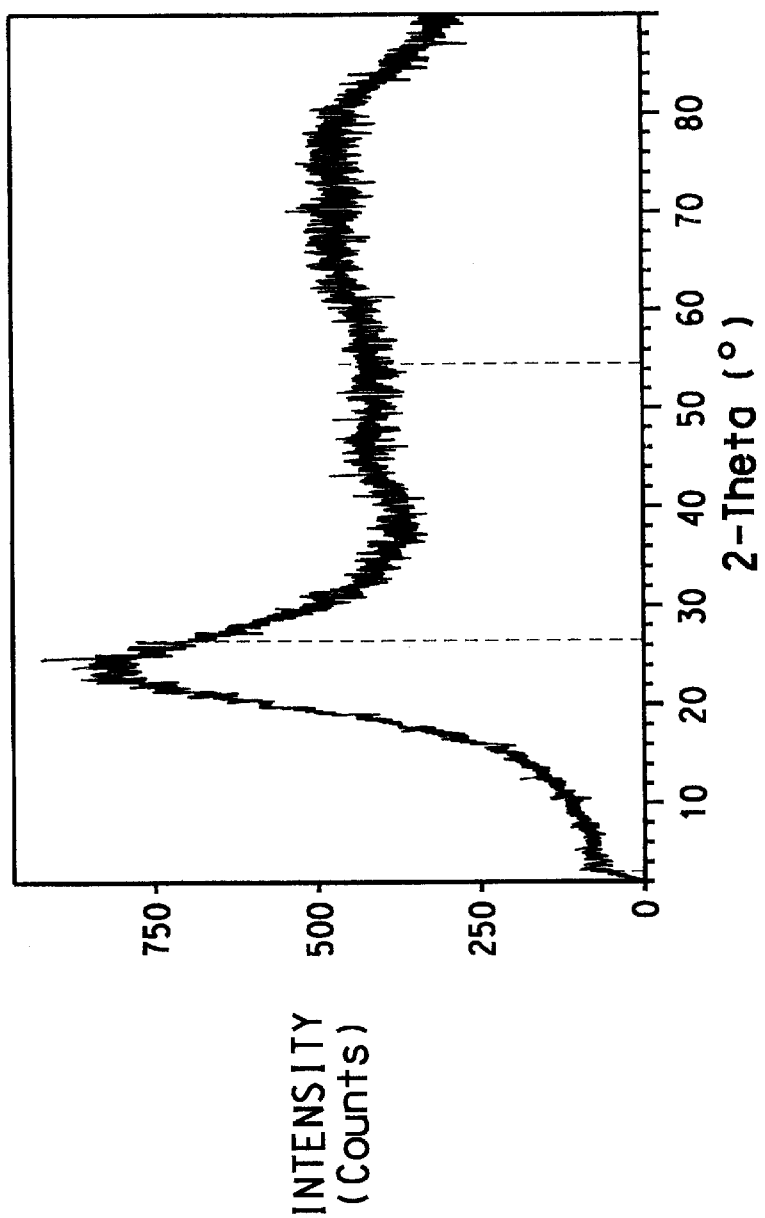
FIG. 1 is an x-ray diffraction spectra of uncalcined $Mg(OEt)_2$+TMOS+acetic acid sample.

A "sol-gel technique" is a process wherein a free flowing solution, "sol", is first prepared by dissolving a suitable precursor material such as colloids, alkoxides or metal salts in a solvent. The "sol" is then dosed with a reagent to initiate reactive polymerization of the precursor material. As polymerization and also crosslinking of the precursor material proceeds, the free flowing "sol" increases in viscosity and can eventually set to a rigid "gel". The "gel" consists of a crosslinked network of the polymerized precursor material that encapsulates the original solvent within an open porous structure. The "gel" may then be dried by many means. Typical means include simple heating in a flow of dry air to produce a xerogel, or displacement of the entrapped solvent with a supercritical fluid such as liquid $CO_2$ to produce an aerogel. The resulting solid may optionally be calcined at elevated temperatures (>200° C.), which results in products that typically have very porous structures and concomitantly high surface areas. A typical example of a precursor material dissolved in a solvent to form a sol is tetraethoxyorthosilicate (TEOS) dissolved in ethanol.

An aspect of the instant invention involves a similar type process for the preparation of mesoporous silica-based materials containing a Group IIA element, and the product so produced. Group IIA is herein defined as the group containing Be, Mg, Ca, Sr, Ba, and Ra. Preferably the Group IIA element is Mg, Ca, or Ba; most preferably it is Mg. Mesoporous is herein defined to mean having an average pore diameter of about 7 to about 20 nanometers (nm). Pore diameter as used herein refers to the diameter of a true circle, or, in the case of a pore that is not shaped as a true circle, the longest interior dimensional line, such as the longest chord or other line that passes through the center of the shape possessed by the pore.

A source compound is used. The source compound contains the Group IIA element, and this compound can be any compound that will dissolve in carboxylic acid. Preferably it is a Group IIA chloride, acetate, or $C_1$–$C_6$ chain or branched alkoxide.

The source compound containing the Group IIA metal is first dissolved in a carboxylic acid. A preferred carboxylic acid is an aliphatic $C_2$–$C_6$, chain or branched monocarboxylic acid, such as but not limited to acetic acid, formic acid, propionic acid, n-butyric acid, isobutyric acid, n-valeric acid, trimethylacetic acid, caproic acid and mixtures thereof. More preferred are acetic acid and formic acid; most preferred is glacial acetic acid. The carboxylic acid is preferably used undiluted.

A silicate is added to the solution of the source compound dissolved in a carboxylic acid to form a precursor mixture. The silicate may be selected from the group consisting of $Si(OR^1)_4$ and $SiR^3(OR^2)_3$, where $R^1$ is a $C_1$ to $C_4$ alkyl group, $R^2$ is a $C_1$ to $C_8$ alkyl group and $R^3$ is H, $C_6H_5$ or $R^2$, where $C_6H_5$ is a phenyl group. Preferred is $Si(OR^1)_4$; more preferred is $Si(OR^1)_4$ where $R^1$ is methyl. In the precursor mixture, the molar ratio of Si to the Group IIA metal is preferably at least about 2, more preferably about 2 to about 14.

A gel then forms. The resultant gel is aged for a time sufficient to incorporate the Group IIA metal into the matrix of the gel, typically about 300 to about 500 hours. During aging, silicon alkoxides undergo a hydrolysis/condensation reaction to form the matrix of the gel. It is desired that the Group II metal remain with this matrix, and the Group II metal is incorporated for this purpose, preferably by becoming bonded to the matrix of the gel.

After aging, the gel is refluxed with a volatile solvent that is miscible or soluble with the carboxylic acid in order to remove the carboxylic acid, and other polar components present in the gel. After decanting off the carboxylic acid solvent, the reflux step should be performed again at least once with the same or a different volatile solvent. Each reflux step should be performed for about 8 hours to about one day. The volatile solvent used in each successive reflux step can be the same or different than the volatile solvent used in the previous reflux step. The volatile solvent used in a later reflux step should also be miscible with and boil at a lower temperature than the carboxylic acid solvent. The potential for the formation of azeotropes should be considered when choosing the solvents. Preferred volatile solvents include hexane and ethanol.

Silylation may optionally be performed on the gel. Suitable silylating agents include organosilanes, organosilylamines, and organosilazanes. Examples of suitable silanes include chlorotrimethylsilane (($CH_3$)$_3$SiCl), dichlorodimethylsilane (($CH_3$)$_2$SiCl$_2$), bromochlorodimethylsilane (($CH_3$)$_2$SiBrCl), chlorotriethylsilane (($C_2H_5$)$_3$SiCl) and chlorodimethylphenylsilane (($CH_3$)$_2$Si($C_6H_5$)Cl). Examples of suitable silazanes include 1,2-diethyldisilazane ($C_2H_5$SiH$_2$NHSiH$_2$$C_2H_5$), 1,1,2,2-tetramethyldisilazane (($CH_3$)$_2$SiHNHSiH($CH_3$)$_2$), 1,1,1,2,2,2-hexamethyldisilazane (($CH_3$)$_3$SiNHSi($CH_3$)$_3$), 1,1,2,2-tetraethyldisilazane ($C_2H_5$)$_2$SiHNHSiH($C_2H_5$)$_2$ and 1,2-diisopropyldisilazane (($CH_3$)$_2$CHSiH$_2$NHSiH$_2$CH($CH_3$)$_2$). Preferred silylating agents include $CF_3C(OSi(CH_3)_3)=NSi(CH_3)_3$ (BSTFA) and Me$_3$SiCl.

The resulting gel product is dried in any manner, such as evaporation or drying under vacuum. More than one drying method could be used in sequence. A suitable method is drying under vacuum at ambient temperature for about 72 hours. After drying, the product can optionally be calcined in any standard manner, such as for one hour at 500° C.

The silica-based material of this invention may also be characterized as having a pore volume of about 1.1 to about 3.0 cc/g and a majority of pores with pore diameter greater than 7 nm. A preferred material has a pore volume of about 1.9 to about 3.0 cc/g, and a majority of pores with pore diameters between about 10 to about 15 nm. These materials additionally do not have pores with a pore diameter less than 2 nm.

The following examples are meant to illustrate the invention but are not intended to limit it in any way.

EXAMPLES

The following definitions are used herein.

APD is average pore diameter measured in nm.
BSTFA is $CF_3C(OSi(CH_3)_3)=NSi(CH_3)_3$.
BET is Brunauer-Emmett-Teller.
BJH is Barrett-Joyner-Halenda.
Mg(OEt)$_2$ is magnesium ethoxide.
MPV is micropore volume, pores where the APD<2 nm
PV is pore volume, measured in cc/g.
RT is room temperature.
TMOS is tetramethoxysilane.
SA is surface area, measured in $m^2/g$.
Wt% is weight %.

Materials and Methods

The following procedure was followed for all samples unless otherwise specified. A Group IIA source was dissolved in glacial acetic acid, to which TMOS was added. The resulting clear, colorless liquid was stirred at room temperature for 24 hrs. The liquid was then aged for at 70° C. for the number of times specified in Table 1 below. The hard, glassy solid was refluxed for the specified number of times and duration with hexane. In some examples, the material was then optionally silylated. The resultant material was air dried at room temperature for 24 hrs and then dried in vacuo at room temperature for 72 hrs. Calcination was performed in an oven at 500° C. for 1 hr.

Silylation, where applicable, was performed as follows. The hexane washed, wet gel from above was suspended in a solution of silylating agent and 500 ml hexane and stirred at room temperature for 72 hrs. The solids were then refluxed for the specified number of times and duration with hexane, and then further refluxed for the specified number of times and duration with ethanol. The resultant material was air dried at room temperature for 24 hrs and then dried in vacuo at room temperature for 72 hrs.

Table 1 below lists the precursors, silylating agent (s. agent), refluxing details, and optional calcination (calc.). Samples 3–5 are comparative examples.

TABLE 1

Preparation details

| Sample # | Group IIA source | Group IIA (g) | Glacial acetic acid (ml) | TMOS (g) | Aging time (hrs) | 1st reflux (#) | 1st reflux time (hrs) | S. agent | S. agent (g) | 2nd reflux (#) | 2nd reflux time (hrs) | 3rd reflux (#) | 3rd reflux time (hrs) | Calc. |
|---|---|---|---|---|---|---|---|---|---|---|---|---|---|---|
| 1 | Mg-ethoxide | 2.86 | 100 | 52.89 | 96 | 2 | 24 | BSTFA | 143.5 | 2 | 24 | 1 | 24 | N |
| 2 | Mg-ethoxide | 1.43 | 50 | 26.45 | 426 | 2 | 24 | BSTFA | 35.9 | 2 | 24 | 1 | 24 | N |
| 3 | none | 0 | 50 | 28.35 | 96 | 2* | 24 | none | — | — | — | — | — | N |
| 4 | none | 0 | 50 | 28.35 | 96 | 2* | 24 | BSTFA | 35.77 | 2 | 24 | 1 | 120 | N |
| 5 | none | 0 | 50 | 28.35 | 96 | 2* | 24 | Me$_3$SiCl | 15.1 | 2 | 24 | 1 | 120 | N |
| 6 | Mg-ethoxide | 1.43 | 50 | 26.45 | 426 | 2 | 24 | none | — | — | — | — | — | N |
| 7 | Mg-ethoxide | 1.43 | 50 | 26.45 | 426 | 2 | 24 | Me$_3$SiCl | 15.1 | 2 | 24 | 1 | 24 | N |
| 8 | Mg-ethoxide | 14.72 | 240 | 116.27 | 333 | 3* | 24 | none | — | — | — | — | — | N |
| 9 | Mg-ethoxide | 14.72 | 240 | 116.27 | 333 | 3* | 24 | none | — | — | — | — | — | Y |
| 10 | Mg-ethoxide | 28.39 | 500 | 99.98 | 474 | 3* | 24 | none | — | — | — | — | — | N |
| 11 | Mg-ethoxide | 28.39 | 500 | 99.98 | 474 | 3* | 24 | none | — | — | — | — | — | Y |
| 12 | Ba-acetate | 1.66 | 50 | 22.83 | 475 | 2* | 24 | none | — | — | — | — | — | N |
| 12A | Ba-acetate | 1.66 | 50 | 22.83 | 475 | 2* | 24 | none | — | — | — | — | — | Y |
| 13 | CaCl$_2$.2H$_2$O | 2.65 | 50 | 22.83 | 505 | 2* | 24 | none | — | — | — | — | — | N |
| 13A | CaCl$_2$.2H$_2$O | 2.65 | 50 | 22.83 | 505 | 2* | 24 | none | — | — | — | — | — | Y |

*1 EtOH exchange for 24 hrs was also done

EXAMPLES

Example 1

TABLE 2

Effect of aging

| Sample # | Description | Si/Mg theor. atomic | Si/Mg found atomic | Mg (wt %) | BET SA (m$^2$/g) | BJH PV (cc/g) | BJH APD (nm) | MPV (cc/g) |
|---|---|---|---|---|---|---|---|---|
| 1 | Mg(OEt)$_2$, TMOS, Acetic acid, (short age), BSTFA | 13.9 | 793 | 0.03 | 798 | 2.5 | 9.30 | 0 |
| 2 | Mg(OEt)$_2$, TMOS, Acetic acid (long age), BSTFA | 13.9 | 44 | 1.18 | 528 | 1.91 | 11.5 | 0 |

Short age = RT/24 hrs, 70° C./96 hrs
Long age = RT/24 hrs, 70° C./426 hrs

Example 2

TABLE 3

Effect of Mg on porosity

| Sample # | Description | Si/Mg theor. atomic | Si/Mg found atomic | Si (wt %) | BET SA (m$^2$/g) | BJH PV (cc/g) | BJH APD (nm) | MPV (cc/g) |
|---|---|---|---|---|---|---|---|---|
| Comp. 3 | TMOS, Acetic acid | n.a. | Not det. | Not det. | 586 | 0.3 | 3.20 | 0.09 |
| Comp. 4 | TMOS, Acetic acid, BSTFA | n.a. | Not det. | Not det. | 759 | 1.96 | 7.30 | 0 |
| Comp. 5 | TMOS, Acetic acid, Me$_3$SiCl | n.a. | Not det. | Not det. | 838 | 1.23 | 4.70 | 0 |
| 6 | Mg(OEt)$_2$, TMOS, Acetic acid | 13.9 | 15 | 35.0 | 555 | 2.01 | 11.2 | 0 |

TABLE 3-continued

Effect of Mg on porosity

| Sample # | Description | Si/Mg theor. atomic | Si/Mg found atomic | Si (wt %) | BET SA (m$^2$/g) | BJH PV (cc/g) | BJH APD (nm) | MPV (cc/g) |
|---|---|---|---|---|---|---|---|---|
| 2 | Mg(OEt)$_2$, TMOS, Acetic acid, BSTFA | 13.9 | 44 | 59.9 | 528 | 1.91 | 11.5 | 0 |
| 7 | Mg(OEt)$_2$, TMOS, Acetic acid, Me$_3$SiCl | 13.9 | 150 | 52.1 | 616 | 2.2 | 10.5 | 0 |
| 8 | Mg(OEt)$_2$, TMOS, Acetic acid (long age) | 6.0 | 33 | 36.1 | 715 | 2.45 | 11.2 | 0 |
| 9 | Mg(OEt)$_2$, TMOS, Acetic acid (long age), calcined 500° C. | 6.0 | 14 | 44.1 | 905 | 2.79 | 12.2 | 0 |
| 10 | Mg(OEt)$_2$, TMOS, Acetic acid (long age) | 2.6 | 18 | 33.4 | 654 | 2.47 | 14.6 | 0 |
| 11 | Mg(OEt)$_2$, TMOS, Acetic acid (long age), calcined 500° C. | 2.6 | 11 | 38.9 | 910 | 2.84 | 12.1 | 0 |

Where no Mg was added in the gel the increase of porosity was observed on solvent exchange and silylation. Porosity was greatly improved by solvent exchanges and further improved by silylation to decrease surface tension between solvent and gel pore walls which allows facile egress of the hexane solvent (Sample 3, 4 and 5).

Where Mg was added an unexpected result was obtained. Samples 6 (solvent exchanges only), 2, and 7 (both silylated) all have similar porosities. This effect was observed for all Mg contents investigated. Sample 6 has the advantage that the Mg content is almost identical to the theoretical value. Evidence of silylation in Samples 2 and 7 was shown by the higher Si-content in these samples. Addition of Mg to the gel obviates the necessity for silylation.

Example 3

Figure 2:
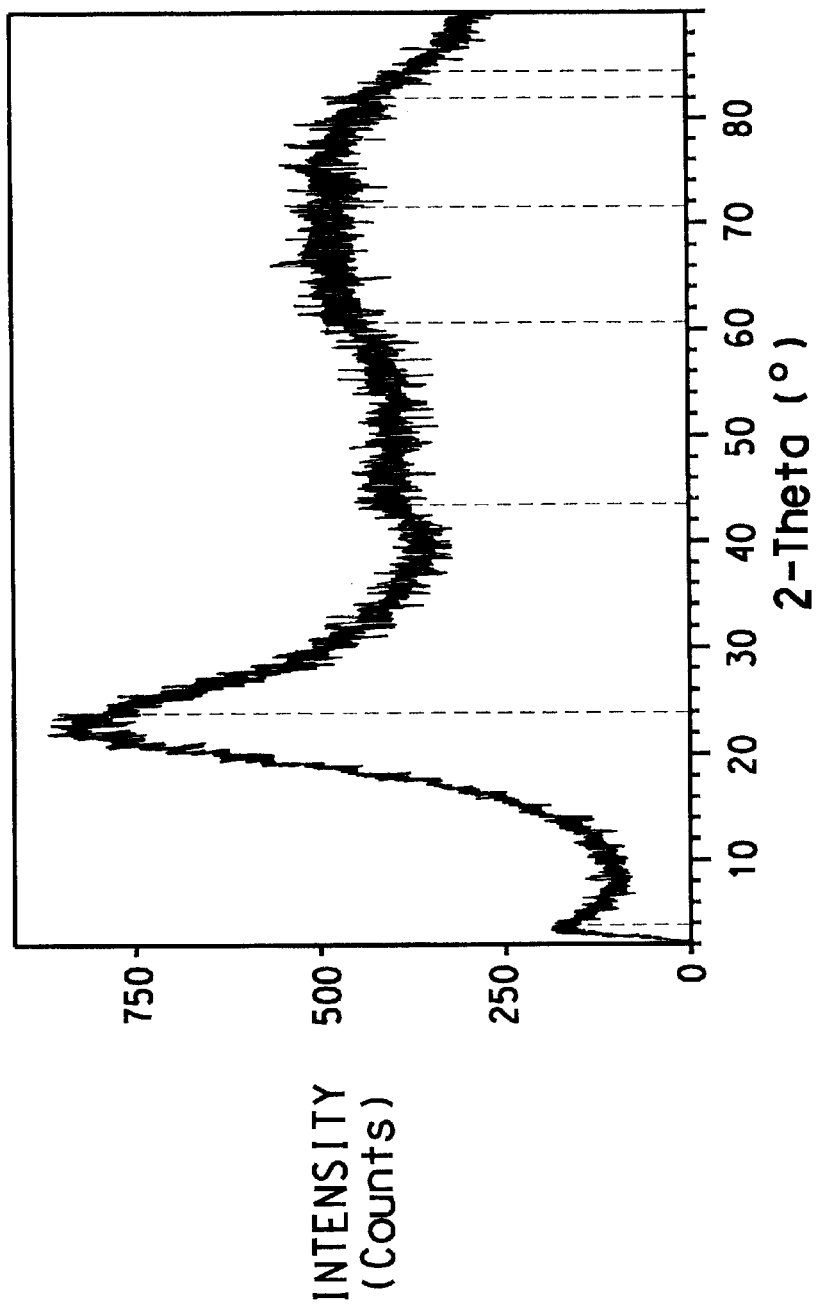
FIG. 2 is an x-ray diffraction spectra of calcined $Mg(OEt)_2$+TMOS+acetic acid sample.

The x-ray diffraction spectra of Samples 8 and 9 are shown in FIGS. 1 and 2, respectively, show that calcination to 500° C. does not cause any crystallization of MgO or a Mg silicate.

Example 4

TABLE 4

Effect of Ba on porosity

| Sample # | Description | Si/Ba theor. atomic | Si/Ba found atomic | Ba (wt %) | BET SA (m$^2$/g) | BJH PV (cc/g) | BJH APD (nm) | MPV (cc/g) |
|---|---|---|---|---|---|---|---|---|
| 12 | 10%BaO/90%SiO$_2$ acetic acid, air and vac. dried | 10.2 | 45.9 | 3.8 | 791 | 2.03 | 87.0 | 0 |
| 12A | Sample 12 calcined at 500° C. for 1 hr | 10.2 | 35.2 | 5.82 | 852 | 2.07 | 91.0 | 0 |

As in the case of Mg it was not necessary to silylate the solvent exchanged BaO/SiO$_2$'s to obtain a highly mesoporous material.

TABLE 5

Effect of Ca on porosity

| Sample # | Description | Si/Ca theor. atomic | Si/Ca found atomic | Ca (wt %) | BET SA (m²/g) | BJH PV (cc/g) | BJH APD (nm) | MPV (cc/g) |
|---|---|---|---|---|---|---|---|---|
| 13 | 10%CaO/90%SiO₂ acetic acid, air and vac. dried | 8.3 | >45000 | 0.001 | 823 | 1.23 | 75.0 | 0 |
| 13A | Above calcined at 500° C. for 1 hr | 8.3 | n.a. | Not determ. | 796 | 1.12 | 73.0 | 0 |

The high porosity obtained with BaO/SiO$_2$'s and MgO/SiO$_2$'s was also obtained with Ca-containing systems. Note that almost no Ca remains in the final product. NA

What is claimed is:

1. A process for preparing a silica-based material, comprising:

(i) dissolving a source compound containing a Group IIA element in a carboxylic acid to form a solution;

(ii) adding to the solution obtained in step (i) a silicate selected from the group consisting of Si(OR$^1$)$_4$ and SiR$^3$(OR$^2$)$_3$, where R$^1$ is a C$_1$ to C$_4$ alkyl group, R$^2$ is a C$_1$ to C$_8$ alkyl group and R$^3$ is H, C$_6$H$_5$ or R$^2$, where C$_6$H$_5$ is a phenyl group, to form a gel;

(iii) aging the gel product obtained in step (ii) for a time sufficient to incorporate the Group IIA element into the gel;

(iv) refluxing the product obtained in step (iii) two or more times in a volatile solvent that is miscible or soluble with the carboxylic acid utilized in step (i);

(v) drying the product obtained in step (iv) to yield a silica-based material;

(vi) optionally, calcining the silica-based material obtained in step (v).

2. The process according to claim 1 wherein the carboxylic acid is acetic acid or formic acid.

3. The process according to claim 1 wherein the carboxylic acid is glacial acetic acid.

4. The process according to claim 1 wherein the source compound is a Group IIA acetate, chloride or alkoxide.

5. The process according to claim 1 wherein the Group IIA element is Mg, Ca, or Ba.

6. The process according to claim 1 wherein the volatile solvent is hexane or ethanol.

7. The process according to claim 1 wherein silylation is performed on the product obtained in step (iv).

* * * * *